United States Patent
Menzel et al.

(10) Patent No.: US 6,342,091 B1
(45) Date of Patent: Jan. 29, 2002

(54) METHOD OF REMOVING CARBON DIOXIDE, SULPHUR COMPOUNDS, WATER AND AROMATIC AND HIGHER ALIPHATIC HYDROCARBONS FROM INDUSTRIAL GASES

(75) Inventors: Johannes Menzel, Oberhausen; Oliver Tondorf, Dortmund, both of (DE)

(73) Assignee: Krupp Uhde GmbH, Dortmund (DE)

( * ) Notice: Subject to any disclaimer, the term of this patent is extended or adjusted under 35 U.S.C. 154(b) by 0 days.

(21) Appl. No.: 09/488,966

(22) Filed: Jan. 21, 2000

(30) Foreign Application Priority Data

Jan. 22, 1999 (DE) .......................... 199 02 383
Sep. 22, 1999 (DE) .......................... 199 45 326

(51) Int. Cl.⁷ .............................. B01D 53/17
(52) U.S. Cl. .......................... 95/167; 95/173; 95/181; 95/183; 95/184; 95/193; 95/235; 95/236; 95/237
(58) Field of Search ............... 95/161, 162, 163, 95/167, 168, 169, 170, 171, 172, 173, 174, 177, 181, 183, 184, 191, 192, 193, 235, 236, 237

(56) References Cited

U.S. PATENT DOCUMENTS

| | | | | |
|---|---|---|---|---|
| 3,555,782 A | * | 1/1971 | Deringer ...................... 95/236 |
| 3,767,766 A | * | 10/1973 | Tjoa et al. ..................... 95/134 |
| 3,773,896 A | | 11/1973 | Preusser |
| 4,080,424 A | * | 3/1978 | Miller et al. ................. 423/223 |
| 4,345,918 A | * | 8/1982 | Meissner ...................... 95/167 |
| 4,530,704 A | * | 7/1985 | Jones et al. .................. 423/243 |
| 4,545,965 A | * | 10/1985 | Gazzi et al. ................. 423/229 |
| 4,556,546 A | * | 12/1985 | Burgoyne et al. ........... 423/226 |
| 5,085,675 A | * | 2/1992 | Kriebel et al. ................ 95/183 |
| 5,490,873 A | * | 2/1996 | Behrens et al. ............... 95/166 |
| 5,797,981 A | * | 8/1998 | Collin et al. .................. 95/174 |
| 6,102,987 A | * | 8/2000 | Gross et al. .................. 95/183 |

FOREIGN PATENT DOCUMENTS

| | | |
|---|---|---|
| DE | 1 568 940 | 7/1970 |
| GB | 2167397 | * 5/1986 |
| GB | 2167738 | * 6/1986 |

* cited by examiner

Primary Examiner—Duane S. Smith
(74) Attorney, Agent, or Firm—Herbert Dubno; Jonathan Myers

(57) ABSTRACT

A process for the removal of carbon dioxide, sulphur compounds, water and aromatic and higher aliphatic hydrocarbons from industrial gases. The sour gas components, water and hydrocarbons are removed from the gas to be treated by absorption at elevated operating pressure. At least one morpholine derivative is used as the absorbent. The absorbent laden with absorbed components is regenerated with the aid of a stripping gas. The stripping gas is generated by partial evaporation of the laden absorbent.

22 Claims, 1 Drawing Sheet

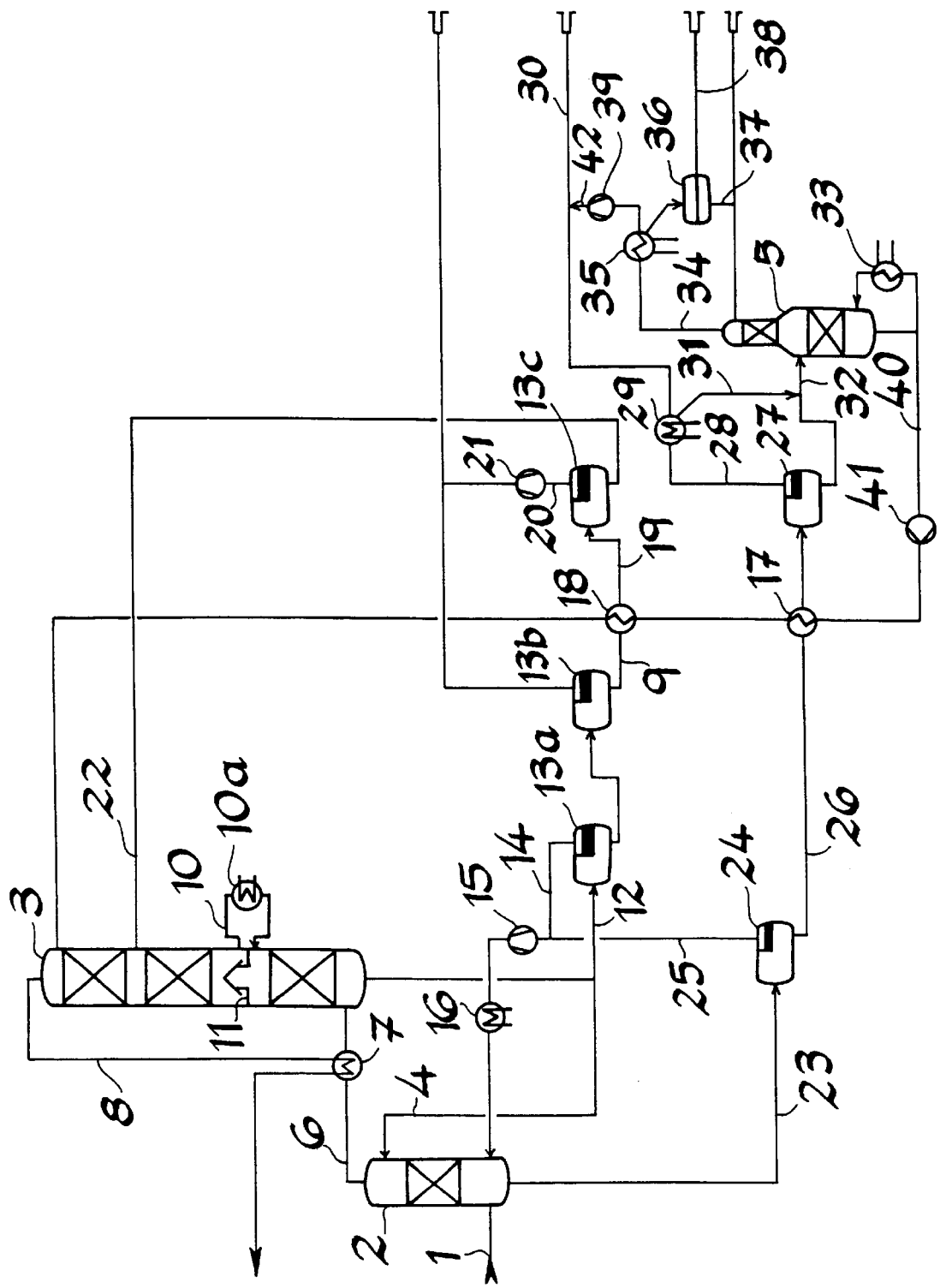

METHOD OF REMOVING CARBON DIOXIDE, SULPHUR COMPOUNDS, WATER AND AROMATIC AND HIGHER ALIPHATIC HYDROCARBONS FROM INDUSTRIAL GASES

FIELD OF THE INVENTION

Our present invention relates to a process for the removal of carbon dioxide, sulphur compounds, water and aromatic and higher aliphatic hydrocarbons from industrial gases. Industrial gases in this context are, in particular, natural gas and/or raw synthesis gas. Sulphur compounds according to the present invention are, in particular, hydrogen sulphide and organic sulphur compounds present in natural gas and raw synthesis gas.

BACKGROUND OF THE INVENTION

Carbon dioxide and hydrogen sulphide are, among others, so-called sour gas components present in natural gas and raw synthesis gas. Apart from sour gas components, such as hydrogen sulphide and carbon dioxide, water vapor must also be removed from natural gas. If the natural gas also contains aromatic hydrocarbons and higher aliphatic hydrocarbons, these can be recovered as a useful substance by absorption using an absorbent. In such case, care must be taken when regenerating the absorbent to ensure that none or only minute quantities of these hydrocarbon components are released or emitted into the environment.

It is known, in principle, that hydrogen sulphide and carbon dioxide can be removed from industrial gases, such as natural gas and synthesis gas, with the aid of chemical absorbents, e.g. ethanolamines, alkaline salt solutions and the like. When using chemical scrubbing agents, the absorbent is present in the form of an aqueous solution. It is, therefore, necessary to dry the industrial gas downstream of the absorption step which removes hydrogen sulphide and carbon dioxide. This is effected preferably by glycol scrubbing or by molecular sieve adsorption. When glycol is used for drying, for instance, aromatic hydrocarbons and higher aliphatic hydrocarbons are partly removed from the natural gas in addition to water. In regenerating the scrubbing solution, these hydrocarbons are emitted disadvantageously to the environment. Statutory requirements allow only limited toleration of such emissions.

U.S. Pat. No. 3,773,896 describes the use of morpholine derivatives as absorbents for hydrogen sulphide and carbon dioxide. By employing thermal regeneration of the absorbent at a temperature of 80° C., 70% to 80% of the absorbed sulphur compounds and 55% to 65% of the absorbed carbon dioxide can be removed from the absorbent. This limited desorption of the dissolved gases from the laden absorbent is disadvantageous, because the gas portions remaining in solution impede the absorption of carbon dioxide, sulphur compounds and water from the raw gas and prevent the achievement of low residual concentrations of these substances in the treated gas.

It is also known from DE 1 568 940 A1 that morpholine derivatives have a high affinity for aromatic hydrocarbons and can, therefore, be used for the removal of these aromatic hydrocarbons from natural gas.

In addition, it is known that physical absorbents, such as polyethylene glycol dimethyl ether, propylene carbonate or methanol, can be used for the removal of hydrogen sulphide and carbon dioxide from industrial gases. In order to remove the major portion of the dissolved sour gas components from the physical scrubbing fluids, the use of inert stripping gases, such as nitrogen, is also known for stripping the dissolved gas components. In these cases, the inert stripping gas flows counter-current to the absorbent laden with sour gas components. The dissolved gas components are entrained by the inert gas and withdrawn from the head of the desorption column.

It is further known that water can be added to the absorbent, the water being vaporized by indirect heating in the bottom of the desorption column. In this way, a quantity of stripping steam is generated as is required for expelling the dissolved gas components from the absorbent. This process is used especially when it is necessary to keep the evaporation temperatures in the column bottom low in order to prevent thermal decomposition of the absorbent. Because of the total miscibility of morpholine derivatives with water, this process can also be used for the removal of sour gas components from the morpholine derivatives. However, the last-mentioned process has a considerable disadvantage, in that the water portion in the absorbent does not contribute towards the sour gas absorption and has to be transported as ballast in the absorbent cycle. Moreover, due to the absorbent being pre-laden with water, an effective removal of the water portion from the industrial gas is not possible.

OBJECTS OF THE INVENTION

It is the object of the present invention to provide a process that permits, on the one hand, the complete removal of various substances, especially sour gas components, water and aromatic and higher aliphatic hydrocarbons with the aid of an adsorbent, and, on the other hand, the complete regeneration of the absorbent or, in other words, virtually total removal of the above-named components from the absorbent.

SUMMARY OF THE INVENTION

To meet this requirement , the present invention describes a process for the removal of carbon dioxide, sulphur compounds, water and hydrocarbons from industrial gases, in which sour gas components, water and aromatic and higher aliphatic hydrocarbons are removed at an elevated operating pressure from the gas to be treated, at least a morpholine derivative is used as the absorbent, the absorbent laden with the absorbed components is regenerated with the aid of a stripping gas, and the stripping gas is generated by partial evaporation of the laden absorbent.

It is an integral part of the invention that the absorbed components are partly removed from the absorbent by pressure relief of thermal regeneration. It is also an integral part of the invention that the stripping gas is generated by partial evaporation of the laden absorbent at negative pressure.

Within the scope of the invention, absorption at an elevated operating pressure means that the absorption takes place at a pressure above standard pressure or above 1 bar. In other words, an absorption column is used operating at a pressure above 1 bar. In a preferred embodiment of the invention, the absorption is performed at an operating pressure of 10 to 150 bar.

A preferred embodiment of the invention provides for the use of at least one morpholine derivative from the group of N-formylmorpholine, N-acetylmorpholine, and N-propionylmorpholine as the absorbent. It is within the scope of the invention that only N-formylmorpholine (NFM)

or only N-acetylmorpholine (NAM) is used. A very preferred embodiment of the invention provides for the use of a mixture of two morpholine derivatives. According to a preferred embodiment, which has a special significance within the scope of the invention, a mixture of N-formylmorpholine (NFM) and N-acetylmorpholine (NAM) is used as the absorbent. The mixing ratio can be in the range of 10 to 90 parts (mass) of NFM to 90 to 10 parts (mass) NAM, referred to 100 parts (mass). A preferred embodiment of the invention provides for the use of 30 to 70 parts (mass) NFM and 70 to 30 parts (mass) NAM, such that the total is 100 parts (mass). The absorbent can also contain 0.1 to 5 parts (mass) of water.

A very preferred embodiment of the invention provides for at least one absorber and an absorbent temperature of −20° C. to +40° C. One embodiment of the invention provides for at least one absorber and an absorbent temperature of −15° C. to +10° C. Another preferred embodiment of the invention provides for an absorbent temperature of −20° C. to 0° C.

According to a very preferred embodiment of the invention, water and hydrocarbons are absorbed in a separate absorption stage. Such a separate absorption stage would appropriately be an upstream absorption column. It would, however, also be within the scope of the invention for the separate absorption stage to be the lower part of an absorption column, the sour gas components being absorbed in the upper part of the column. The preferred operating pressure of the separate absorption stage for the absorption of water and hydrocarbons is 10 to 150 bar and the absorbent is appropriately a mixture of N-formylmorpholine (NFM) and N-acetylmorpholine (NAM). The preferred mixing ratio of NFM and NAM is the advantageous ratio mentioned above. It is within the scope of the invention that the temperature of absorbent in the separate absorption stage for the absorption of water and hydrocarbons is −20° C. to +40° C. One embodiment of the invention provides for an absorbent temperature of −15° C. to +10° C. The preferred temperature is −20° C. to 0° C.

According to a preferred embodiment of the invention, the sour gas components are absorbed in a separate absorption stage. This separate absorption stage for the absorption of sour gas components is preferably an absorption column arranged downstream of the separate absorption stage for the absorption of water and hydrocarbons. However, within the scope of the invention the separate absorption stage for the absorption of sour gas components can be the upper part of an absorption column, the lower part being used for the absorption of water and hydrocarbons. It is expedient that the separate absorption stage for the absorption of sour gas components or the respective absorption column be operated at a pressure of 10 to 150 bar. The preferred absorbent is a mixture of N-formylmorpholine (NFM) and N-acetylmorpholine (NAM), the preferred mixing ratio being the ratio already described above. Within the scope of the invention, that the temperature of the absorbent used in the absorption stage for the absorption of sour gas components can be −20° C. to +40° C. An embodiment of the invention provides −15° C. to +10° C. for this temperature. A preferred embodiment provides for a temperature of −20° C. to 0° C.

It is within the scope of the invention that the components to be removed from the industrial gas, namely carbon dioxide, sulphur compounds, water, aromatic hydrocarbons and higher aliphatic hydrocarbons be absorbed by the morpholine derivatives as completely as possible. The absorbent laden with these absorbed components is regenerated with the aid of a stripping gas. To this end, the laden absorbent is fed to a desorber or desorption column completely or as a part stream, where the regeneration of the laden absorbent takes place in accordance with the invention. The stripping gas required for regenerating the absorbent is generated according to the invention by partial evaporation of the laden absorbent stream or part stream withdrawn from the absorption unit. in a preferred embodiment of the invention, the partial evaporation of the laden absorbent stream is performed at a pressure of 0.1 to 0.7 bar (absolute), preferably at a pressure of 0.2 to 0.4 bar (absolute). It is expedient that the partial evaporation is performed in the sump of a desorption column. Hence it is within the scope of the invention that the regeneration of the absorbent in the desorber or the desorption column is achieved by partial evaporation at a partial vacuum. Among other things, this avoids inadmissible high temperatures that would jeopardize the stability of the absorbent. The vaporized portion of the absorbent that forms during its partial evaporation serves as the stripping agent used for the virtually total removal of the absorbed components of the industrial gas to be treated, such as carbon dioxide, hydrogen sulphide, aromatic hydrocarbons and higher aliphatic hydrocarbons from the liquid portion of the absorbent.

According to a very preferred embodiment of the invention, the partial evaporation of the absorbent is performed in the sump of a desorption column at partial vacuum. Thus, with this embodiment of the invention, the stripping gas is generated in the sump of the desorption column or in the desorber bottom.

The invention is based on the surprising discovery that, upon performing the process according to the invention, a virtually total removal of sour gas components, water, as well as aromatic hydrocarbons and higher aliphatic hydrocarbons is possible without any problems. Moreover, upon performing the process, virtually total regeneration of the absorbent laden with the above-mentioned components is surprisingly possible. The sour gas components, water portions and hydrocarbons absorbent are surprisingly virtually totally removed from the absorbent.

A person versed in the art would not expect that such a complete regeneration of the absorbent laden with several components is possible using stripping gas generated according to the invention by partial evaporation of the absorbent.

By employing the partial evaporation of the absorbent according to the invention, preferably in the desorber sump under partial vacuum, the energy required for regeneration is considerably reduced as compared with that required for the known regeneration described earlier, in which the stripping gas is generated by evaporation of the water added to the absorbent. This results from the fact that the quantity of water added to a physically acting absorbent does not contribute towards the absorption of carbon dioxide and sulphur components, thus increasing the recirculated quantity of absorbent which, in turn, results in higher energy requirements or energy costs as compared to the process according to the invention. Compared with the known processes, the energy necessary for the evaporation of the stripping gas from the absorbent is considerably lower, because the heat of evaporation of the morpholine derivatives is only ¼ of the heat of evaporation of water.

In a very preferred embodiment of the invention, the gas components recovered from the absorbent are withdrawn at the head of the desorber or desorption column, the water and hydrocarbons being condensed by partial condensation, an aqueous liquid phase and a hydrocarbon-bearing liquid phase being obtained. The hydrocarbon-bearing liquid phase is understood to mean a liquid phase that contains aromatic hydrocarbons and higher aliphatic hydrocarbons. It is thus within the scope of the invention that the partial condensation in a partial condenser yields two separate liquid phases. In a preferred embodiment of the invention, part of the aqueous liquid phase of the condensate is recycled to the head of the desorbers or desorption column for absorbent recovery. A part stream of the aqueous liquid phase, the quantity of which corresponds to the quantity of water absorbed from the gas stream to be treated, is preferably removed. In a preferred embodiment of the invention, the hydrocarbon-bearing liquid phase, i.e. the phase containing the aromatic and higher aliphatic hydrocarbons, obtained in partial condensation is removed as a product containing valuable substances.

In a very preferred embodiment of the invention, the sour gas components withdrawn from the desorber are compressed to the operating pressure of the absorption unit. The sour gas components leaving the partial condensation unit or the partial condenser are preferably recycled to the absorber. The sour gas components are, in particular, carbon dioxide, sulphur components and the residual light hydrocarbons. The sour gas components still contain minor quantities of aromatic and higher aliphatic hydrocarbons. As an expedience, the pressure of the entire sour gas stream leaving the partial condensation unit or partial condenser is raised to the pressure of the absorption unit with the aid of a compressor and the compressed sour gas stream is then recycled to the absorption unit. It is within the scope of the invention that this compressed sour gas stream is fed to the separate absorption stage for the absorption of hydrocarbons. In this way, the residual quantities of aromatic and higher aliphatic hydrocarbons are effectively removed. This embodiment has special advantages, as the process according to the invention completely avoids the detrimental emission of hydrocarbons. Alternatively, the sour gas stream leaving the desorber, and preferably the sour gas stream leaving the partial condenser, can be fed to the suction side of recycle gas compressor which is always present when a physical scrubbing system is used. In this way, the sour gas stream is fed, together with the recycle gas stream, by the recycle compressor to the absorption unit. If a portion of the sour gas components is withdrawn in the regeneration unit, especially if the sulphur components and carbon dioxide are to be won separately, it is possible to withdraw the sour gas fraction via a flash vessel arranged upstream of the desorber or the desorption column at any temperature and pressure. In the event that carbon dioxide and sulphur components are won separately, it is within the scope of the invention that the carbon dioxide can be withdrawn from the absorbent stream not being fed to the desorber in one or more thermal stages by thermal regeneration at any desired pressure.

The absorbent regenerated in accordance with the invention is preferably cooled downstream of the regeneration unit and subsequently returned to the regeneration unit. Surprisingly, it is possible with the process according to the invention to remove carbon dioxide, water, aromatic and higher aliphatic hydrocarbons almost completely from the gas to be treated. Hydrogen sulphide can be removed by the process to a residual content of 1 ppmv, carbon dioxide to a residual content of 10 ppmv and the water to a residual content of 1 ppmv.

BRIEF DESCRIPTION OF THE DRAWING

The above and other objects, features, and advantages will become more readily apparent from the following description, reference being made to the accompanying drawing in which the sole FIGURE of which is a flow diagram illustrating the invention.

SPECIFIC DESCRIPTION

The drawing illustrates schematically a device for the implementation of the process according to the present invention. Raw gas stream 1 of an industrial gas containing, in particular, carbon dioxide, hydrogen sulphide, organic sulphur compounds, water vapor, aromatic hydrocarbons and higher aliphatic hydrocarbons is fed to absorber 2. The raw gas stream may contain a high portion of sour gas components, e.g. 10% to 90% (by vol.) carbon dioxide. Preferably, and in the example illustrated, the raw gas to be treated is fed to the sump of absorber 2.

In absorber 2, the water, aromatic and higher aliphatic hydrocarbons and, if applicable, the sulphur components contained in raw gas stream 1 are absorbed by an absorbent consisting preferably of a mixture of NFM and NAM flowing in counter-current. The pressure set in absorber 2 is preferably 10 to 150 bar. In the example illustrated, absorber 2 is in the form of a separate absorption stage or absorption column. The absorption column can be filled with bulk packing material or structured packing material or contain trays. The absorption in absorber 2 is preferably performed at a temperature of –20° C. to +40° C. As a rule, this cools raw gas stream 1 in absorber 2. The absorbent is appropriately fed to the top of absorber 2 via line 4.

Preferably, and in the example illustrated, the absorbent is a part stream of the entire absorbent stream leaving the bottom of absorber 3, which is described below, and which is laden with carbon dioxide, hydrogen sulphide and other sulphur components. This absorbent stream, which is laden with sour gas components, becomes further laden with water and hydrocarbons, especially aromatic and higher aliphatic hydrocarbons. The absorbent stream laden with the named substances leaves the sump of absorber 2 and is fed to desorber 5, in which the absorbent is regenerated. The regenerated absorbent is preferably returned to absorber 3 which is described in detail below.

Gas stream 6, from which water and hydrocarbons and, if applicable, sulphur components have been removed, leaves absorber 2 and is then preferably cooled with the aid of heat exchanger 7. The treated gas 8 leaving absorber 3 and absorbent 9, which is cooled by pressure relief as described below, can be used as coolant.

Gas stream 6 is then fed to absorber 3 and the remaining sour gas components are removed there, preferably at an operating pressure of 10 to 150 bar. Absorber 3 is preferably and in the illustrated example is constructed as a separate absorption stage or as an absorption column for the absorption of sour gas components. The absorption column can contain bulk packing material or structured packing material or it may be equipped with trays.

The absorbent used in absorber 3 is a mixture of NFM and NAM, the absorption being preferably performed at a temperature of –20° C. to +40° C. Absorbent 12 laden with the sour gas components is withdrawn from the sump of absorber 3. Part of this absorbent 12 laden with sour gas components is fed to absorber 2 and the remainder is regenerated by pressure relief as described below and fed to the central part of absorber 3. In order to dissipate the heat of absorption generated in absorber 3, one or several intercoolers 10a are provided to cool the absorbent leaving the absorption column. The absorbent to be cooled is withdrawn as a liquid side stream 10 on intermediate tray 11 of absorber 3, cooled and returned to absorber 3 below intermediate tray 11. The gas 8 treated in absorber 3 is withdrawn at the top of absorber 3.

In the preferred embodiment and in the example illustrated, the absorbent, which is laden with the sour gas components and which is withdrawn from the sump of absorber 3, is fed to a multi-stage pressure-relief system, insofar as it is not fed to absorber 2. The multi-stage pressure-relief system consists expediently of several series-connected flash vessels 13a, 13b, 13c, in which the sour gas components are removed from the absorbent and in which the absorbent is simultaneously cooled. Preferably, the laden absorbent 12 is first fed to flash vessel 13a, the operating pressure of which is selected with a view to obtaining a gas phase 14 containing mainly hydrocarbons.

This gas phase 14 can expediently and in the example illustrated be compressed by compressor 15 to the operating pressure of absorber 2 and, preferably after cooling in heat exchanger 16, recycled to absorber 2. The preferred flash pressure of the second flash vessel 13b is selected to ensure thorough cooling of absorbent 9 withdrawn from flash vessel 13a. The absorbent 9 withdrawn from flash vessel 13b is preferably used for further cooling the absorbent stream from desorber 5 expediently pre-cooled in absorbent heat exchanger 17. This further cooling takes place in at least one heat exchanger 18. The preheated and partly laden absorbent 19 leaving heat exchanger 18 is expediently cooled in a further depressurized flash vessel 13c before entering absorber 3. The flash process cools the absorbent to the temperature required for absorption in absorber 3 and the remaining dissolved sour gas components are simultaneously removed from the absorbent. These sour gas components are preferably withdrawn as sour gas stream 20 at the head of flash vessel 13c. The operating pressure in flash vessel 13c is expediently selected to obtain the residual lading of the absorbent with sour gas components so as to achieve the desired product gas purity. The operating pressure of flash vessel 13c is preferably in the range of 0.3 to 1.5 bar (absolute), very preferably in the range of 0.4 to 1.1. bar (absolute). It is within the scope of the invention that a partial vacuum, such as may be necessary in flash vessel 13c, is generated by a compressor 21 which compresses the gas stream 20 leaving flash vessel 13c to the required sour gas export pressure. The regenerated and cooled absorbent leaving flash vessel 13c is preferably fed via line 22 to the central part of absorber 3 where it is again available for the removal of sour gas components from gas stream 6.

The laden absorbent 23 leaving absorber 2 is preferably first fed to flash vessel 24, the operating pressure of which is expediently such that, when the laden absorbent 23 is depressurized, a gas phase 25 is obtained which mainly contains hydrocarbons. This gas phase 25 is preferably compressed with the aid of compressor 15 to the pressure of absorber 2 and preferably returned to absorber 2 after cooling in heat exchanger 16. The absorbent 26 is withdrawn from flash vessel 24, preferably heated in absorbent heat exchanger 17 and then expediently fed to a flash vessel 27. Flash vessel 27 is preferably operated at an elevated pressure not exceeding the operating pressure of absorber 2. The pressure set in this flash vessel 27 is preferably only just below the operating pressure of absorber 2. The dissolved sour gases are removed extremely effectively if the laden absorbent is intensely pre-heated. As a result, the major portion of the sour gas dissolved in the laden absorbent can be flashed at a pressure that corresponds to, or is preferably only just below, the operating pressure of absorber 2. The sour gas stream 28 leaving flash vessel 27 is expediently cooled in a cooler 29 and withdrawn as sour gas stream 30. Any vaporous solvent as well as aromatic and higher aliphatic hydrocarbons still present in sour gas stream 28 are preferably condensed and recycled as condensate stream 31 to the inlet side of desorber 5. Absorbent 32 laden with residual quantities of sour gas components is fed to desorber 5 for regeneration, where its pressure is reduced to a lower pressure. Desorber 5 is preferably operated at a partial vacuum of 0.2 to 0.4 bar (absolute). The regeneration takes place here by stripping with the aid of a stripping gas which is generated by partial evaporation of the absorbent. In this process, the remaining sour gas components are expelled.

Desorber 5, which is used for desorption, is preferably in the form of a desorption column that may contain bulk packing material or a structured packing or which may be equipped with trays. The thermal regeneration of the absorbent by stripping with the aid of stripping gas or with absorbent vapors takes place in a reboiler 33 with the aid of steam or another suitable heating agent. A sour-gas-rich vapor phase 34 is withdrawn at the head of desorber 5 and then preferably cooled in partial condenser 35, whereby the aromatic and higher aliphatic hydrocarbons as well as water contained in the vapor phase 34 are condensed. As a result, a separate aqueous liquid phase and a separate hydrocarbon-bearing liquid phase are formed. The two fractions can be separated with the aid of vessel 36. Part of the aqueous phase 37 is recycled to the head of desorber 5. Another part of aqueous phase 37, the quantity of which corresponds to the quantity of water removed from raw gas stream 1, is withdrawn from the process. The hydrocarbon-bearing phase is also withdrawn from the process as product stream 38. The uncondensed gas components leaving partial condenser 35, such as carbon dioxide, sulphur components and light hydrocarbons, are compressed in compressor 39 to the pressure required for export and leave the process as sour gas stream 30.

The absorbent solution 40, from which the dissolved sour gas components have been almost totally removed, is withdrawn from the sump of desorber 5 and preferably recycled to the head of absorber 3 by means of circulating pump 41. The heat of the hot regenerated solution is expediently transferred to the laden absorbent 26 by means of absorbent heat exchanger 17. Prior to entering absorber 3, the temperature of the regenerated absorbent is preferably adjusted to the preferred absorption temperature of −20° C. to +40° C. with the aid of heat exchanger 18. The regenerated and cooled absorbent is then available for a renewed removal of sour gas components in absorber 3.

The sour gas stream 30, which contains carbon dioxide, sulphur compounds and water, and which may also contain minor quantities of aromatic and higher aliphatic hydrocarbons, is alternatively admixed to the gas stream leaving flash vessel 13a. In this way, the substances contained in sour gas stream 30 are not withdrawn from the process, but returned to absorber 2. The fact that the aromatic and higher aliphatic hydrocarbons are removed in this absorber 2 prevents a detrimental emission of these hydrocarbons into the environment. It is also within the scope of the invention that, instead of the entire sour gas stream 30, only the sour gas stream 42 from partial condenser 35 is admixed to the gas stream 14. This likewise prevents the detrimental emission of aromatic and higher aliphatic hydrocarbons.

We claim:

1. A process for removal of sour gas components including carbon dioxide and sulphur compounds, water and aromatic and higher aliphatic hydrocarbons from an industrial gas, comprising the steps of:

(a) scrubbing an industrial gas containing sour gas components, water and aromatic and higher aliphatic hydrocarbons at an elevated operating pressure with an absorbent in the form of at least one morpholine derivative to remove substantially the sour gas components, water and aromatic and higher aliphatic hydrocarbons from the industrial gas and produce an absorbent laden with absorbed components;

(b) generating a stripping gas by vaporizing a part of the laden absorbent; and (c) stripping the absorbed components from the laden absorbent with said stripping gas.

2. The process according to claim 1 wherein absorption in step (a) is performed at an operating pressure of 10 to 150 bar.

3. The process according to claim 1 wherein a mixture of at least two morpholine derivatives is used as the absorbent.

4. The process according to claim 3 wherein a mixture of N-formylmorpholine and N-acetylmorpholine is used as the absorbent.

5. The process according to claim 1 wherein the absorbent is used at a temperature of −20° C. to +40° C. in at least one absorber.

6. The process according to claim 1 wherein water and hydrocarbons are removed in a separate absorption stage.

7. The process according to claim 1 wherein the sour gas components are absorbed in a separate absorption stage.

8. The process according to claim 1 wherein the partial evaporation of the laden absorbent is performed at a pressure of 0.1 to 0.7 bar (absolute).

9. The process according to claim 1 wherein the partial evaporation of the absorbent is performed in the bottom of a desorption column.

10. The process according to claim 1 wherein the gas components removed from the absorbent are withdrawn at the head of a desorber, water and hydrocarbons are condensed by partial condensation of the gas components, and an aqueous liquid phase and a hydrocarbon-bearing liquid phase are obtained.

11. The process according to claim 10 wherein part of the aqueous phase being recycled to the head of the desorption column.

12. The process according to claim 1 wherein sour gas component withdrawn from a desorber in step (c) is compressed to the operating pressure and recycled to an absorber for step (a).

13. A process for the total removal of sour gas components including carbon dioxide and sulfur compounds, as well as water and aromatic and higher aliphatic hydrocarbons from an industrial gas containing natural gas or synthesis gas, comprising the steps of:

(a) scrubbing the industrial gas containing sour gas components, water, and aromatic and higher aliphatic hydrocarbons at an elevated operating pressure with an absorbent of at least one morpholine derivative previously used to scrub the industrial gas and laden with the sour gas components to remove substantially the water and aromatic and higher aliphatic hydrocarbons from the industrial gas and produce an absorbent laden with the sour gas components, water and aromatic and higher aliphatic hydrocarbons and an industrial gas containing natural gas or synthesis gas depleted in the water and aromatic and higher aliphatic hydrocarbons;

(b) subjecting the industrial gas scrubbed according to step (a) to a second scrubbing at an elevated operating pressure with the absorbent of at least one morpholine derivative as defined in step (a) but in regenerated form free of the sour gas components and the aromatic and higher aliphatic hydrocarbons to remove additional amounts of the water and the aromatic and higher aliphatic hydrocarbons as well as the sour gas components from the industrial gas thereby producing a purified industrial gas and additional absorbent laden with the sour gas components, water and aromatic and higher aliphatic hydrocarbons;

(c) generating a stripping gas by evaporating a part of the laden absorbent; and (d) stripping absorbed components from the laden absorbent with said stripping gas to obtain regenerated absorbent and recycling the regenerated absorbent to step (b).

14. The process according to claim 13 wherein absorption in step (a) or the absorption in step (b) is performed at an operating pressure of 10 to 150 bar.

15. The process according to claim 13 wherein according to step (a) or step (b) a mixture of at least two morpholine derivatives is used as the absorbent.

16. The process according to claim 15 wherein a mixture of N-formylmorpholine and N-acetylmorpholine is used as the absorbent.

17. The process according to claim 13 wherein according to step (a) or step (b) the absorbent is used at a temperature of −20° C. to +40° C.

18. The process according to claim 13 wherein water and hydrocarbons are removed from the industrial gas and absorbed by the absorbent according to step (a) in an absorption stage separate from an absorption stage in step (b).

19. The process according to claim 13 wherein the sour gas components are removed from the industrial gas and absorbed by the absorbent according to step (b) in a separate absorption stage from an absorption stage in step (a).

20. The process according to claim 13 wherein according to step (c) the partial evaporation of the laden absorbent is performed at a pressure of 0.1 to 0.7 bar absolute.

21. The process according to claim 13 wherein according to step (c) the partial evaporation of the absorbent is performed in the bottom of a desorption column.

22. The process according to claim 13 according to step (d) wherein the absorbed sour gas stripped component is compressed to the operating pressure and recycled to step (a).

* * * * *